(12) United States Patent
Goddard et al.

(10) Patent No.: US 7,791,781 B2
(45) Date of Patent: Sep. 7, 2010

(54) RAPIDLY RECONFIGURABLE ALL-OPTICAL UNIVERSAL LOGIC GATE

(75) Inventors: Lynford L. Goddard, Hayward, CA (US); Tiziana C. Bond, Livermore, CA (US); Jeffrey S. Kallman, Pleasanton, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 498 days.

(21) Appl. No.: 11/805,115

(22) Filed: May 21, 2007

(65) Prior Publication Data

US 2008/0130084 A1 Jun. 5, 2008

Related U.S. Application Data

(60) Provisional application No. 60/802,850, filed on May 22, 2006.

(51) Int. Cl.
*G02F 3/00* (2006.01)
(52) U.S. Cl. .................................................... 359/108
(58) Field of Classification Search ................. 359/107, 359/108
See application file for complete search history.

(56) References Cited

U.S. PATENT DOCUMENTS

| 6,151,428 A | 11/2000 | Vahala et al. |
| 6,853,658 B1 | 2/2005 | DiJaili et al. |
| 2010/0097677 A1* | 4/2010 | Nazarathy et al. ........... 359/108 |

* cited by examiner

*Primary Examiner*—Alessandro Amari
(74) *Attorney, Agent, or Firm*—John P. Wooldridge (57) ABSTRACT

A new reconfigurable cascadable all-optical on-chip device is presented. The gate operates by combining the Vernier effect with a novel effect, the gain-index lever, to help shift the dominant lasing mode from a mode where the laser light is output at one facet to a mode where it is output at the other facet. Since the laser remains above threshold, the speed of the gate for logic operations as well as for reprogramming the function of the gate is primarily limited to the small signal optical modulation speed of the laser, which can be on the order of up to about tens of GHz. The gate can be rapidly and repeatedly reprogrammed to perform any of the basic digital logic operations by using an appropriate analog optical or electrical signal at the gate selection port. Other all-optical functionality includes wavelength conversion, signal duplication, threshold switching, analog to digital conversion, digital to analog conversion, signal routing, and environment sensing. Since each gate can perform different operations, the functionality of such a cascaded circuit grows exponentially.

72 Claims, 5 Drawing Sheets

RAPIDLY RECONFIGURABLE ALL-OPTICAL UNIVERSAL LOGIC GATE

RELATED APPLICATION

This application claims the benefit of U.S. Provisional Application No. 60/802,850, filed May 22, 2006, and entitled, "RAPIDLY RECONFIGURABLE ALL-OPTICAL UNIVERSAL LOGIC GATE," which is incorporated herein by this reference.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to optical logic gates, optical communication devices and systems, and optical computing devices and systems, and optical sensors. More particularly, the present invention relates to a cascadable all-optical, reconfigurable, universal logic gate device and method to perform all-optical or hybrid electro-optical digital logic operations.

2. Description of Related Art

Efficient, high-speed, single transverse mode, all-optical gates with positive inverter gain and a reasonably large contrast ratio are needed for on-chip digital photonic logic circuits. Positive inverter gain, a.k.a. high fanout, is the ability to shut off a strong optical signal using a weaker input signal. It is needed in order to cascade logic gates without introducing external amplifiers. Contrast is the ratio of the output power when the digital output represents 1 to when it represents 0. It is a key factor in determining signal noise margins and strongly affects bit error rates.

Various approaches and strategies for such high-speed optical gates have included using: (1) a pre-amplifier to boost the weaker input signal, (2) the gain lever effect to enhance gain quenching, (3) a saturable absorber to accelerate gain quenching, and (4) carrier induced non-linear effects. Each on-chip approach or combination of approaches to date has significant performance tradeoffs among efficiency, speed, single mode operation, inverter gain, and contrast ratio. These tradeoffs are unavoidable in devices that use optical gain quenching or optical bistability because when the laser is quenched below threshold, it takes an incredibly long time to turn back on. This time constant is related to the carrier lifetime, and thus limits the operational speeds for such devices. Partial quenching solutions may increase the speed but at the expense of signal contrast. Another fundamental problem is that the device speed increases with bias, whereas gain quenching is optimal just above transparency ($N_c^{ideal} \approx e \cdot N_{tr}$, where $e=2.718$) due to the competing effects of increasing stimulated emission and decreasing differential gain with bias. Gain quenched devices tend to have their highest inverter gain just above threshold, which is where they are slowest.

Accordingly, a need exists for an efficient, high-speed, single transverse mode, all-optical, on-chip device with positive inverter gain and a substantially large contrast ratio that can perform unary operations (NOT or COPY), and/or one of the 6 binary operations (OR, XOR, AND, NOR, XNOR, or NAND), and/or one of the many operations involving more than two inputs. The present invention is directed to such a need.

SUMMARY OF THE INVENTION

Accordingly, the present invention is directed to a cascadable all-optical, on-chip reconfigurable universal logic gate device that includes a gate selection port and at least one input signal so as to capitalize on the Vernier effect with the gain-index lever effect, described herein, to help shift the dominant lasing mode from a mode where the laser light is output at one facet to a mode where it is output at the other facet.

Accordingly, the present invention provides a new reconfigurable cascadable all-optical on-chip device that can be used to perform all-optical or hybrid electro-optical Boolean digital logic operations: OR, XOR, AND, NOR, XNOR, NAND, NOT, or COPY either as a standalone device or as part of a larger photonic integrated circuit. Its ability to be reprogrammed and cascaded enables various applications in reconfigurable and self-configuring computing, e.g., dynamic signal routing, genetic algorithm searches, adaptive photonic sensor networks or portable data encryption for secure digital optical communications using rapidly reconfiguring encryption algorithms. It can also be used as a self-modulating ring oscillator that can serve as an optical clock source. The device can also perform all-optical wavelength conversion, signal duplication, threshold switching, analog to digital conversion, digital to analog conversion, signal routing, and environment sensing operations.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Unless otherwise indicated, all numbers expressing quantities of ingredients, constituents, reaction conditions and so forth used in the specification and claims are to be understood as being modified in all instances by the term "about". Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Moreover, in the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise.

General Description

One complication inherent in all-optical cascadable devices is that the device(s) are to respond to the input signals but be insensitive to the resulting changes. In electro-optical systems, this is easy since the input signal can be electrical which distinguishes it from the circulating optical signal. In non-cascadable all-optical systems, this is also easy since the wavelengths or polarizations can be different.

In the novel embodiments disclosed herein, the wavelengths are the same and further, when the lasing mode changes, the asymmetric circulating power profile changes drastically. This change is usually much larger than the input signal that created the change to begin with, which normally can present a problem. To address this problem, the present invention utilizes a narrow region at about the middle of the laser length for the input because the amplitude of the circulating light in the very center of the laser is unchanged when the output facet switches.

Additional arrangements to make the input light intensity stronger than the circulating light intensity while still maintaining a single mode output can also include: (1) circulating the input light by reflecting it a predetermined number of times across the input region and (2) making the laser a multimode interferometer with single mode output tapers at each end. The first arrangement increases the effective input light intensity while the second arrangement decreases the circulating light intensity in the input region without changing the output power. Such arrangements also increase the fanout of the device. The present invention also provides non-absorbing mirrors to prevent their reflectivities from shifting. This can be accomplished, as known by those of ordinary skill in the art, either by biasing them at transparency or by using quantum well intermixing to blueshift the bandgap. The tradeoff for the two arrangements is between requiring additional current controls or additional wafer processing steps. However, the quantum well intermixing approach can also solve the problem of unwanted carrier diffusion between electrically isolated sections.

The present invention is thus directed to a new reconfigurable cascadable all-optical on-chip device that can include, but is not just limited to: (1) an input port, (2) a gate selection port, and (3) an output port. The gate operates by combining the Vernier effect with a gain-index lever effect, described herein, to help shift the dominant lasing mode from a mode where the laser light is output at one facet to a mode where it is output at the other facet. Since the laser remains above threshold, the speed of the gate for logic operations as well as for reprogramming the function of the gate is primarily limited to the small signal optical modulation speed of the laser, which can be on the order of tens of GHz.

Accordingly, the reprogrammable nature of the universal gate of the present invention offers maximum flexibility and interchangeability since adjusting the gate selection port signals can change the entire application of a photonic integrated circuit built from cascaded universal logic gates. The gate can be rapidly and repeatedly reprogrammed to perform any of the basic digital logic operations by using an appropriate analog optical or electrical signal at the gate selection port. Specifically, the same gate can be selected to execute one of the 2 basic unary operations (NOT or COPY), or one of the 6 binary operations (OR, XOR, AND, NOR, XNOR, or NAND), or one of the many operations involving more than two inputs.

Specific Description

Basic Principles

Figure 1A:
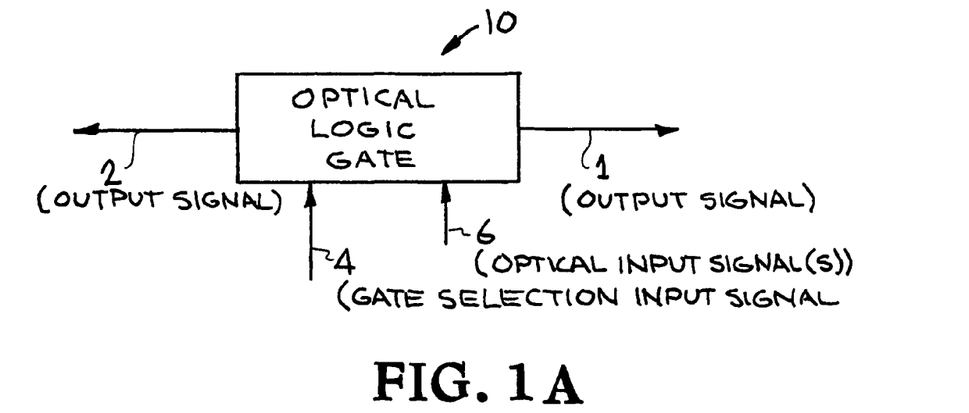
FIG. 1a shows a simplistic block diagram of an example universal logic gate of the present invention.

Turning now to the drawings, FIG. 1a shows a simplistic block diagram of an example universal logic gate of the present invention, which is generally designated by the reference numeral 10, and includes a first signal output port 1 (shown as a directional arrow), a second signal output port 2 (also shown as a directional arrow), a gate selection input signal 4 (shown as a directional arrow), and an optical input signal(s) 6 (shown as a directional arrow).

Figure 1B:
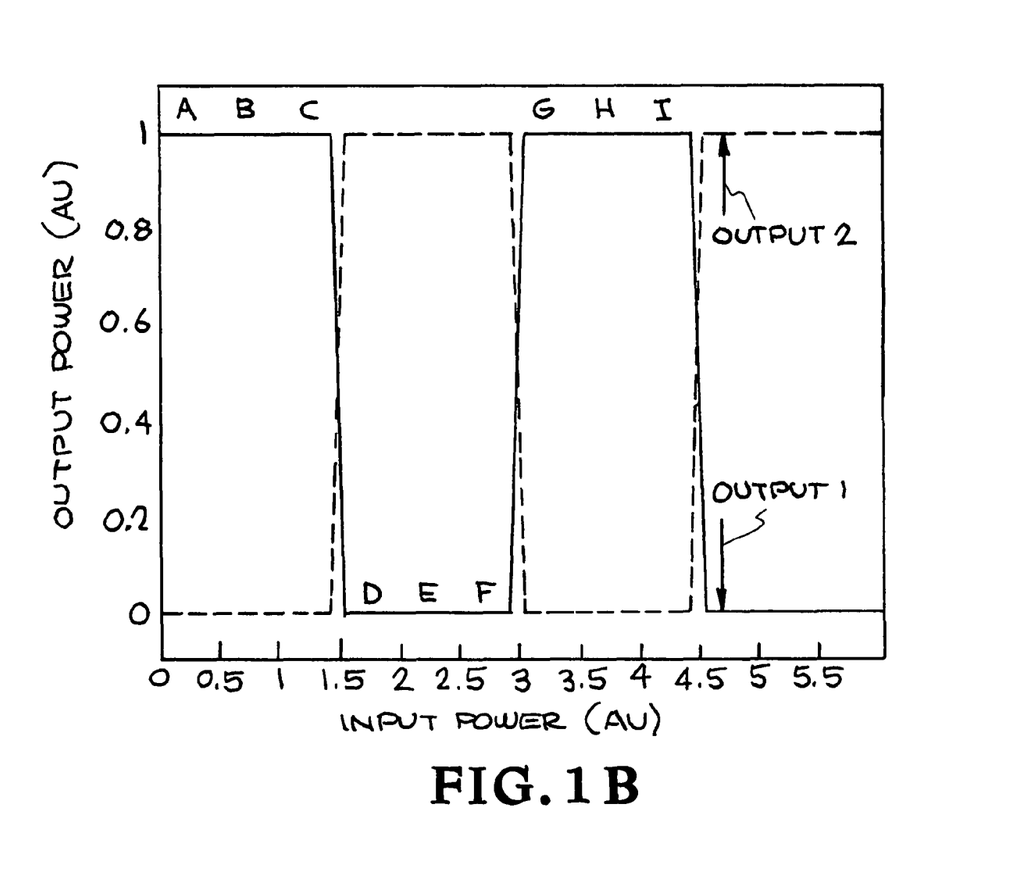
FIG. 1b illustrates example ideal logic gate operations that can be produced from embodiments of the present invention.

FIG. 1b illustrates example ideal characteristics produced from the logic gate 10, as illustrated in FIG. 1a. Specifically, FIG. 1b shows ideal characteristics for the output power from first output port 1 (shown as a solid line in FIG. 1b) and second output port 2 (shown as a dotted line in FIG. 1b) as a function of total input power resulting from optical input signals 4 and 6, as shown in FIG. 1a. The scale in FIG. 1b is the same for the vertical and for the horizontal axes. Each on or off region (i.e., a 1 or a 0) is ideally about 1.5 units wide and the letters from A, B, C, D, E, F, G, H and I are uniformly spaced by about 0.5 units.

It is to be appreciated that the novel alternating output facets, i.e. first output port 1 and second output port 2, as shown in FIG. 1a, are digital negations of each other. In a method of operation, an applied analog gate selection signal 4 to logic device 10 translates the curves in FIG. 1b to the left and thereby selects a particular gate operation. For instance, a continuous 1.25 unit selection signal centers label C on the vertical axis and selects XNOR operation at first output port 1. Then, input of two digital bits (0 or 1) unit each via optical input signal(s) 6 puts the operation point at C on for 00 input, E=off for 01 or 10, and G=on for 11. In a similar manner, a 1.75 unit selection signal centers label D and selects AND operation since the input puts the operation at D=off for 00, F=off for 01 or 10, and H=on for 11. The correspondence between letters (as shown in FIG. 1b) and binary gate operation is A=NAND, B=NOR, C=XNOR, D=AND, E=OR, and F=XOR. The necessary selection signals are 0.25, 0.75, 1.25, 1.75, 2.25, and 2.75 units, respectively. The correspondence between letters and unary gate operations are B or C=NOT and E or F=COPY since a NOT gate is the same as a NOR or XNOR gate with one of the inputs set to 0 and a COPY gate is the same as an OR or XOR gate with one of the inputs set to 0. Digital input bits of the same amplitude can be used for all logic operations, which improve cascadability. Two full periods of the periodic power dependence, as shown in FIG. 1b, are sufficient to cover all logic operations.

In a method of constructing an optical logic gate 10 that can conform to the specifications of the present invention, a two step approach is often utilized. The first step includes designing desired wavelength dependent mirrors. At predetermined wavelengths, which correspond to half of the Fabry-Perot modes, a left facet can be configured with, as an example, a high reflectivity (R) greater than about 40% while a right facet can be configured with, as an example, a low reflectivity of less than about 2% so that almost all of the circulating laser power is output from a desired side, e.g., output port 1 as shown in FIG. 1a. At other wavelengths, which correspond to the other half of the longitudinal modes, the right facet has a high reflectivity while the left facet has a low reflectivity so that the laser light is output from the left side, e.g., output port 2 as shown in FIG. 1a.

The second step includes devising a layout such that a small input optical signal efficiently shifts the dominant lasing mode to a desired mode by combining an optical effect, the gain-index lever, with a well-known to those of ordinary skill in the art Vernier effect, to accomplish such an objective. The gain lever can be used to enhance the carrier-induced refractive index change and thereby increase the tuning rate of DFB lasers. A detailed discussion of the gain lever effect can be found in "Two-Section Gain-Levered Tunable Distributed Feedback Laser with Active Tuning Section," by G. Griffel, R. Lang, and A. Yariv, IEEE J. Quantum Electron., 30, pp. 15-18 (January 1994), and is herein incorporated by reference.

Mirror Design

Sampled grating (SG) or superstructure grating (SSG) distributed Bragg reflectors (DBRs) are two exemplary choices for obtaining the desired reflectivity properties of the present invention. With respect to superstructure grating (SSG) distributed Bragg reflectors (DBRs), computer aided design simulations can be utilized to engineer the desired reflectivity profiles. For a SG-DBR, one skilled in the art can produce a comb of reflectivity peaks with a specific spacing and amplitude envelope by using a periodically sampled continuous grating. As part of the novelty as described herein, the present invention has the additional requirement of alternating output facets.

The present invention will be more fully understood by reference to the following example, which is intended to be illustrative of the present invention, but not limiting thereof.

Figure 2A:
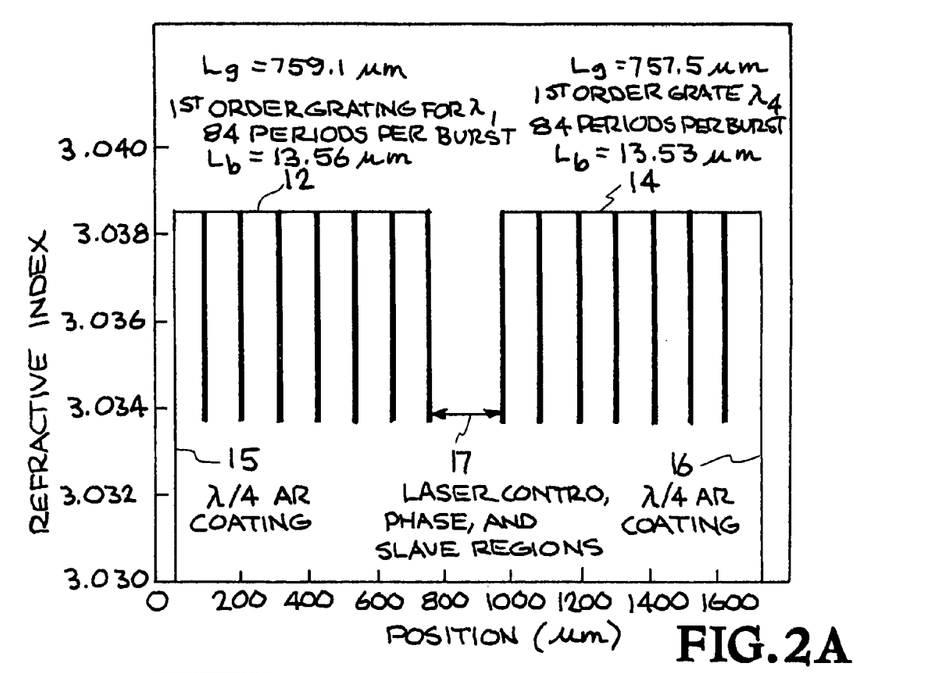
FIG. 2a shows the desired refractive index profile of an example design.
Figure 2B:
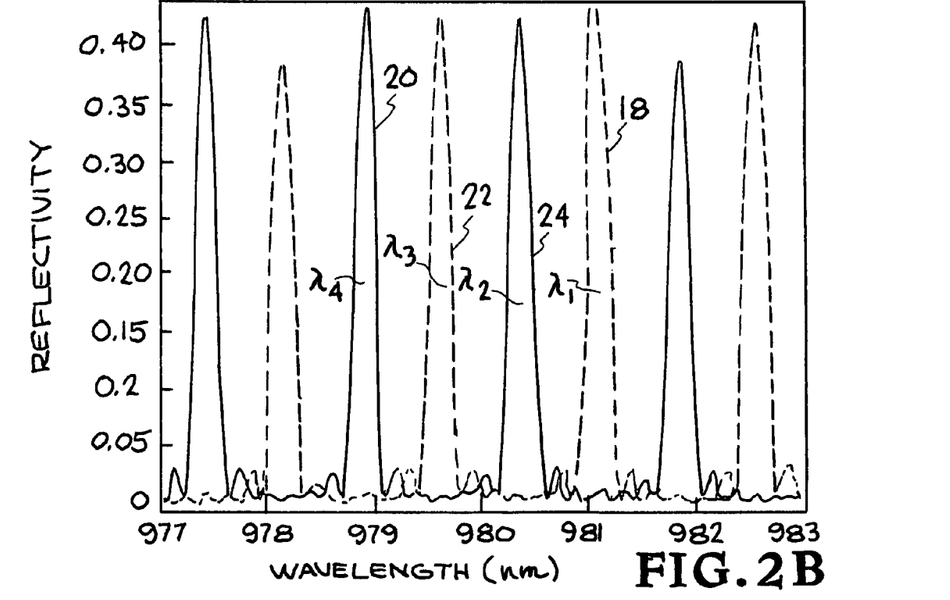
FIG. 2b shows a resultant simulated reflectivity spectra for mirrors that are symmetrically offset from a desired wavelength (e.g., $\lambda_d=980$ nm).

A design wavelength ($\lambda_d$) from about 400 nm to about 2000 nm is first assumed, e.g., $\lambda_d$=850 nm, 952 nm, 980 nm, 1310 nm, 1550 nm, etc., wherein a particular design wavelength is a simple matter of rescaling device dimensions and changing the materials of various device layers. For this example, a laser gain peak is assumed to be at 980 nm. FIG. 2a shows a desired refractive index profile of an example design and FIG. 2b shows the resultant simulated reflectivity spectra for two mirrors that are symmetrically offset from $\lambda_d$ to have central wavelengths of $\lambda_1$=981.09 nm (shown as a dotted line and denoted by the reference numeral 18) and $\lambda_2$=978.92 nm (shown as a solid line and denoted by the reference numeral 20). As shown in FIG. 2a, a laser control/phase/slave region 17 is interposed between, for example, each mirror (denoted by reference numerals 12 and 14 respectively) which has 7 grating bursts (kappa=100 cm$^{-1}$) configured with, for example, about a 12.5% burst duty cycle and a single layer quarter wave anti-reflective coating (n=1.8) (denoted by reference numerals 15 and 16 respectively) prior to each air interface. The total mirror grating lengths are an integral number of half wavelengths, e.g., $L_{g1,g4}$=m$\lambda_{1,4}$/2n$_r$ with m=4704, yielding $L_{g1}$=759.1 μm and $L_{g4}$=757.5 μm. The choice of m=4704=$2^5\times3\times7^2$ arose from the requirement that the length of each grating section must be an integral number of half wavelengths. Thus, m must be divisible by 56 since there are 7 grating bursts and the burst duty cycle is 1:8. This leads to 84 grating periods per grating burst and burst lengths of $L_{b4}$~13.56 μm and $L_{b2}$~13.53 μm. The factors in 4704 enable the effects of different duty cycles, e.g., 1:4, 1:6, 1:7, 1:8, 1:16, and numbers of grating bursts, e.g., 3, 4, 6, 7, 12, while maintaining a constant mirror length. The example 7 grating bursts generate exactly 7−2=5 local maxima between the major comb peaks. The central wavelengths can be chosen so that each major peak occurs at the same wavelength as the smallest of these local maxima and so that there are exactly two major peaks, at $\lambda_3$=979.64 nm (denoted as reference numeral 22 in FIG. 2b) and $\lambda_2$=980.37 nm (denoted as reference numeral 24 in FIG. 2b), of slightly lower amplitude between the design wavelengths peaks, i.e., wavelengths $\lambda_1$=981.09 nm denoted by reference numeral 18 and $\lambda_4$=978.92 nm denoted by reference numeral 20, as shown in FIG. 2b, wherein $\lambda_1$=981.09 nm and $\lambda_3$=979.64 nm can be directed out of a predetermined output facet, e.g., a right output facet, and $\lambda_2$=980.37 nm and $\lambda_4$=978.92 nm can be directed out of a predetermined output facet, e.g., a left output facet to perform the unary operations (NOT or COPY), and/or 6 binary operations, as disclosed herein.

Figure 3A:
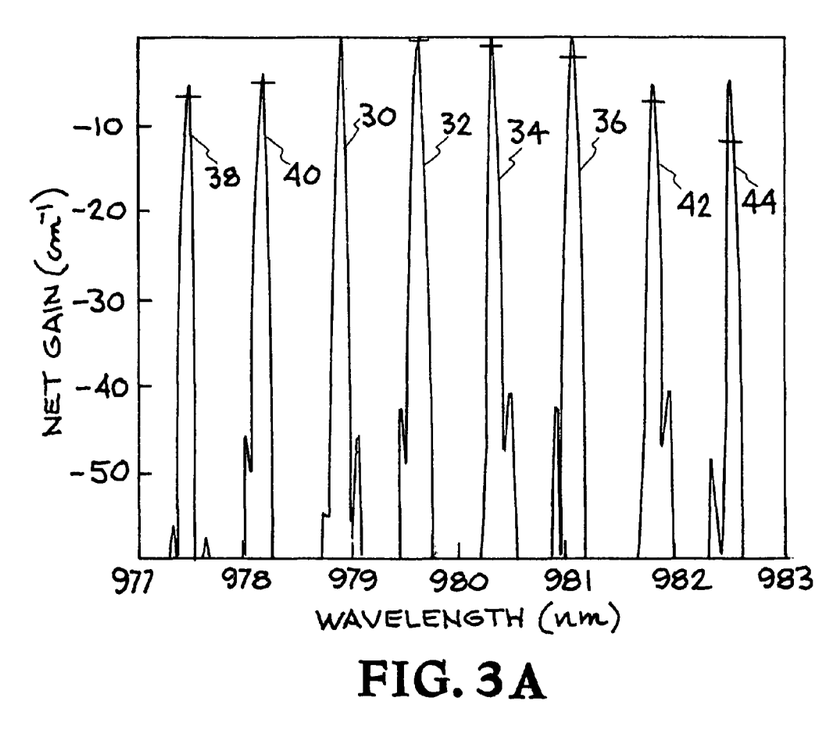
FIG. 3a shows the round trip gain versus wavelength for an example laser having configured DBR mirrors.

FIG. 3a shows the round trip gain versus wavelength for an example 211.4 μm long laser with the exemplary DBR mirrors discussed above with respect to FIG. 2a and FIG. 2b. As illustrated in FIG. 3a, 4 modes, as indicated by reference numerals 30, 32, 34, and 36 respectively, are generated with the same round-trip gain since the slightly weaker reflectivity peaks (i.e., modes denoted by reference numerals 32 and 34) have slightly higher material gain than modes denoted by reference numerals 30 and 36. The central peak wavelengths for modes 30, 32, 34, and 36 are finely tuned so that the wavelength separation between such adjacent maxima in the net gain spectrum is constant. The marked crosses in FIG. 3a indicate the wavelengths that satisfy the round-trip phase requirements for lasing. These crosses, i.e., wavelength locations, shift with carrier density. Such an arrangement ensures that a device of the present invention emits in only one of these wavelength modes. Moreover, the reflectivity ratios at these predetermined wavelengths also ensure that the laser output is directed substantially from the low reflectivity facet of a particular device. In addition, the high and low reflectivities in the example design alternate for adjacent peaks. For the example arrangement discussed above for FIG. 2a and FIG. 2b, the facet reflectivities are about 44% and 0.91%. Thus, for this particular example arrangement, about 92% of the laser light is output through the low reflectivity facet since:

$$\frac{P_2}{P_1} = \frac{1-R_2}{1-R_1}\sqrt{\frac{R_1}{R_2}} \qquad (1)$$

where $P_1$ and $P_2$ are the emitted powers and $R_1$ and $R_2$ are the reflectivities of mirrors 1 and 2, respectively.

The Gain-Index Lever

Figure 3B:
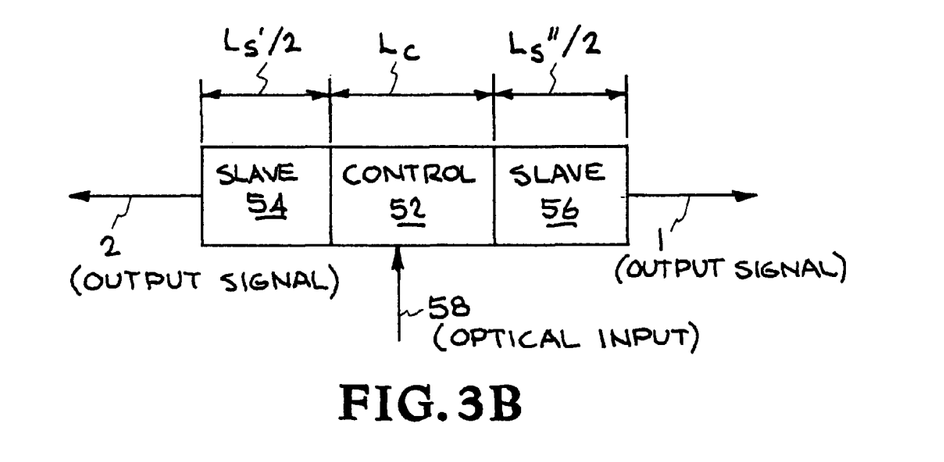
FIG. 3b illustrates the ordinary gain lever effect for an example laser embodiment of the present invention.

FIG. 3b illustrates the ordinary gain lever effect for a laser, wherein an electrically isolated control section ($L_c$) 52 is configured in the center of a pair of longer slave regions (denoted as $L_s'$/2 54 and $L_s''$/2 56) that are biased to a high carrier density, $N_s$, while a control section 52 is biased to a moderate carrier density, $N_c$. All of the sections are above transparency, $N_{tr}$, and can experience gain. In the method of operation for the ordinary gain lever effect, a directed optical input 58 causes stimulated emission within the control section 52 and correspondingly reduces the control carrier density $N_c$. The round-trip gain is now less than the loss and so the circulating optical power decreases. Since the circulating power decreases, the carrier density of the slave sections 54 and 56 begin to increase until the round-trip gain equal loss condition is re-established. However, due to the sub-linear gain versus carrier density relationship, the slave carrier density $N_s$ increase is enhanced compared to the control density decrease. Specifically:

$$L_s \frac{\partial g}{\partial N_s} \Delta N_s = -L_c \frac{\partial g}{\partial N_s} \Delta N_c \quad (2)$$

$$\Delta N_s = -\frac{L_c}{L_s} \frac{\frac{\partial g}{\partial N_c}}{\frac{\partial g}{\partial N_s}} \Delta N_c \quad (3)$$

Such a process is the ordinary gain lever effect, whereby a small change in $N_c$ results in a large change in $N_s$. An enhancement factor, or gain lever, is defined to only include the ratio of the differential gains, i.e., $$GL \equiv \frac{\frac{\partial g}{\partial N_c}}{\frac{\partial g}{\partial N_s}} = \frac{N_s}{N_c} \quad (4)$$

where an assumed logarithmic gain versus carrier density relationship is utilized to evaluate the differential gains. From equation (4), it appears that the gain lever can be made arbitrarily large by reducing the control section density. However, when the device is lasing, the circulating laser power will pump the control section and increase the density to transparency. Thus, the maximum gain lever is $N_s/N_{tr}$.

To understand the gain-index lever effect, consider the wavelength shift caused by the carrier-induced change to the optical path length of the laser from above. Lasing not only requires that the round-trip gain equals the loss, but also that the round-trip phase be an integer multiple of $2\pi$ (constructive interference). The refractive index (mode index) of the laser decreases with carrier density and so the wavelengths that experience constructive interference (i.e., the marked crosses in FIG. 3a) shift with carrier density. To maintain constructive interference, the change in the round-trip optical path length must be zero:

$$0 = \Delta \phi_{rt} = \Delta \left[ 4\pi \frac{(n_r^c L_c + n_r^s L_s)}{\lambda} \right] \quad (5)$$

$$\Delta \lambda = \frac{\lambda}{n_r^c L_c + n_r^s L_s} \frac{\partial n_r^c}{\partial N_c} L_c \Delta N_c \left(1 - \frac{\alpha_s}{\alpha_c}\right); \quad (6)$$

where $n_r^c$ and $n_r^s$ and $\alpha_c$ and $\alpha_s$ the refractive indices and line-width enhancement factors for the control and slave sections, respectively; note that Equation 3 is used to evaluate $\Delta N_s$ in terms of $\Delta N_c$. The line-width enhancement factor for the control section for example, is given by $\alpha_c = -4\pi(\partial n_r^c/\partial N_c)/$ $(\partial g/\partial N_c)$. It is to be appreciated that the refractive indices of the two sections are almost identical, i.e., $n_r \approx n_r^c \approx n_r^s$, but that the differential refractive indices can be quite different. It is also to be appreciated that Equation 6 represents a blueshift $(\Delta \lambda < 0)$ if $\alpha_s > \alpha_c$ since $\partial n_r^c/\partial N_c < 0$ and $\Delta N_c < 0$.

From equation 6, the laser embodiments of the present invention can be directly modulated without any wavelength chirp if $\alpha_s$ is arranged to be equal to $\alpha_c$. Such a chirp-free behavior enables the lasers of the present invention to be configured as transmitters in dense wavelength division multiplexing (DWDM) applications. A second consequence that comes from equation 6 is an index lever, IL, defined by the ratio of the wavelength shift for the multi-section device compared to the shift for a one-section device, i.e. no slave sections, wherein the ratio is given by:

$$IL \equiv 1 - \frac{\alpha_s}{\alpha_c}. \quad (7)$$

Since the line-width enhancement factors are usually positive, the present invention configures $\alpha_s > 2\alpha_c$ to achieve a true index lever ($|IL| > 1$), i.e. an enhancement in the wavelength shift. Thus, the embodiments of the present invention can be designed to achieve the full gain-index lever by choosing a wide quantum well and/or a barrier material with relatively small band offsets ($\approx 2-3 k_B T$ for $\Delta E_c$ and $\Delta E_v$) to the quantum well. These two design choices result in a large value for $\alpha_s$ when the slave section bias is large because there are a large number of excited carriers in energy states near to the lasing transition and these excited carriers contribute strongly to the refractive index without strongly changing the lasing gain. As an example to illustrate the principles of such an arrangement, as known by those of ordinary skill in the art, a shallow InGaAs well, e.g., a 5.2 nm $In_{0.16}Ga_{0.84}As$ single quantum well embedded in a 300 nm GaAs barrier/waveguide layer well can be incorporated since line-width enhancement data is available and the quantum well composition and thickness yield 980 nm operation. However, the embodiments of the present invention are further configured with up to about 2 quantum wells of a designed thickness, e.g., 10.4 nm, to increase the linewidth enhancement factor due to the wider wells and to further increase the optical confinement factor so as to overcome a resultant mirror loss.

Laser Design

As a beneficial arrangement, a multi-section device as disclosed herein can be disposed therein, for example, the wavelength dependent mirrors described by FIG. 2b. Since the mirror reflectivities vary with wavelength and the wavelength varies with carrier density, the mirror loss changes with carrier density. As discussed above, a side input optical signal reduces the carrier density in the control section and thereby decreases the circulating optical power. The slave section carrier density begins to increase, but now, the round-trip gains for the constructive interference wavelengths change because the reflectivity is not constant. The round-trip gain for the dominant mode begins to decrease from its maximum. Thus, the dominant laser mode is designed in a novel way to switch between a left output and a right output mode whenever such round-trip gains pass each other. Since the mirror reflectivities are now wavelength dependent, the mirror(s) phase also varies and accordingly, equations 5 and 6 as discussed above need modification to include the phase changes, $\phi_m^l$ and $\phi_m^r$, for the left and right mirrors respectively. Accordingly, equations 5 and 6 are modified as equations 8 and 9 as follows:

$$0 = \Delta\phi_{rt} = \Delta\left[4\pi\frac{(n_r^c L_c + n_r^s L_s)}{\lambda} + \phi_m^l + \phi_m^r\right] \quad (8)$$

$$\Delta\lambda = \frac{\lambda}{n_r^c L_c + n_r^s L_s + n_r^g(L_{eff}^l + L_{eff}^r)}\left(\frac{\partial n_r^c}{\partial N_c}L_c\Delta N_c\right)lL; \quad (9)$$

Where $L_{eff}^l$ and $L_{eff}^r$ are the effective mirror lengths defined by:

$$L_{eff} \equiv \frac{\lambda^2}{4\pi n_r}\frac{\partial\phi}{\partial\lambda}. \quad (10)$$

It is to be appreciated that $L_{eff}$ is highly wavelength dependent because the phase derivative varies considerably. Thus, the size of the wavelength shift of a constructive interference location, i.e., $\alpha\lambda$ in Equation 9, depends on its location in the reflectivity spectrum. For a weakly reflecting continuous DBR grating, the effective length of 1 mirror near the Bragg frequency (central maximum) is half the total grating length, i.e. $L_{eff}^l = Lg/2$. However, the effective length is shorter for a sampled grating DBR.

To estimate the carrier density changes needed for a desired switching, Equation 9 is rewritten in a dimensionless form by normalizing it to the average mode spacing for constructive interference, $MS = \lambda^2/(2n_r L_{avg})$:

$$\frac{\Delta\lambda}{MS} = \left[\frac{L_{avg}}{L_{local}}\right]\left(\frac{2}{\lambda}\frac{\partial n_r^c}{\partial N_c}L_c\Delta N_c\right)lL; \quad (11)$$

where $L_{avg} = L_c + L_s + L_{eff\ avg}^l + L_{eff\ avg}^r$ and $L_{local} = L_c + L_s + L_{eff\ avg}^l + L_{eff}^r$. It is to be appreciated that $L_{eff\ avg}^l$ and $L_{eff\ avg}^r$ are constants whereas $L_{eff}^l$ and $L_{eff}^r$ vary with wavelength. The constructive interference locations undergo a full period of translation when the absolute value of the ratio, $\Delta\lambda/MS$, in Equation 11 increases from zero to one. By definition, $L_{local} = L_{avg}$ when averaged over 1 translation period.

Example devices as disclosed herein can be engineered with a Vernier effect having a carrier density change ($\Delta N_c$) of less than about $9 \times 10^{16}$ cm$^3$ so as to meet the design considerations for the present invention. Thus, in order to meet such considerations, the constructive interference wavelength spacing is designed to be smaller than the net gain peak wavelength separations as shown in FIG. 3a. To illustrate the principles of such an arrangement, the constructive interference wavelength spacings can be about 1% smaller with $L_c + L_s$ having a predetermined length so that $L_{avg}$ can be a designed length, e.g., 224.9 µm. The gain peak location separations are then approximately designed to be $\lambda^2/2n_r L_{eff}^{gp}$ with $L_{eff}^{gp} = L_g/3.41 \approx 222.4$ µm. The factor 3.41 arises because the reflectivity maximum and smallest local maximum are separated by about 3.5 orders, i.e., half of the 7 orders between the comb teeth. Such a factor results from fine tuning of the design wavelengths, e.g., $\lambda_1$ and $\lambda_4$, to make the mode spacing approximately constant so as to reduce the target separation to the example beneficial 3.41 orders. With an example 1% difference between the mode spacing and the net gain peak spacing, a total translation of up to about 8% of the constructive interference wavelengths can thus be configured to sequentially tune the dominant laser mode through the 4 modes and achieve a full switching cycle, i.e., two full periods or 6 units of input optical power, as shown in FIG. 1b.

Figure 4:
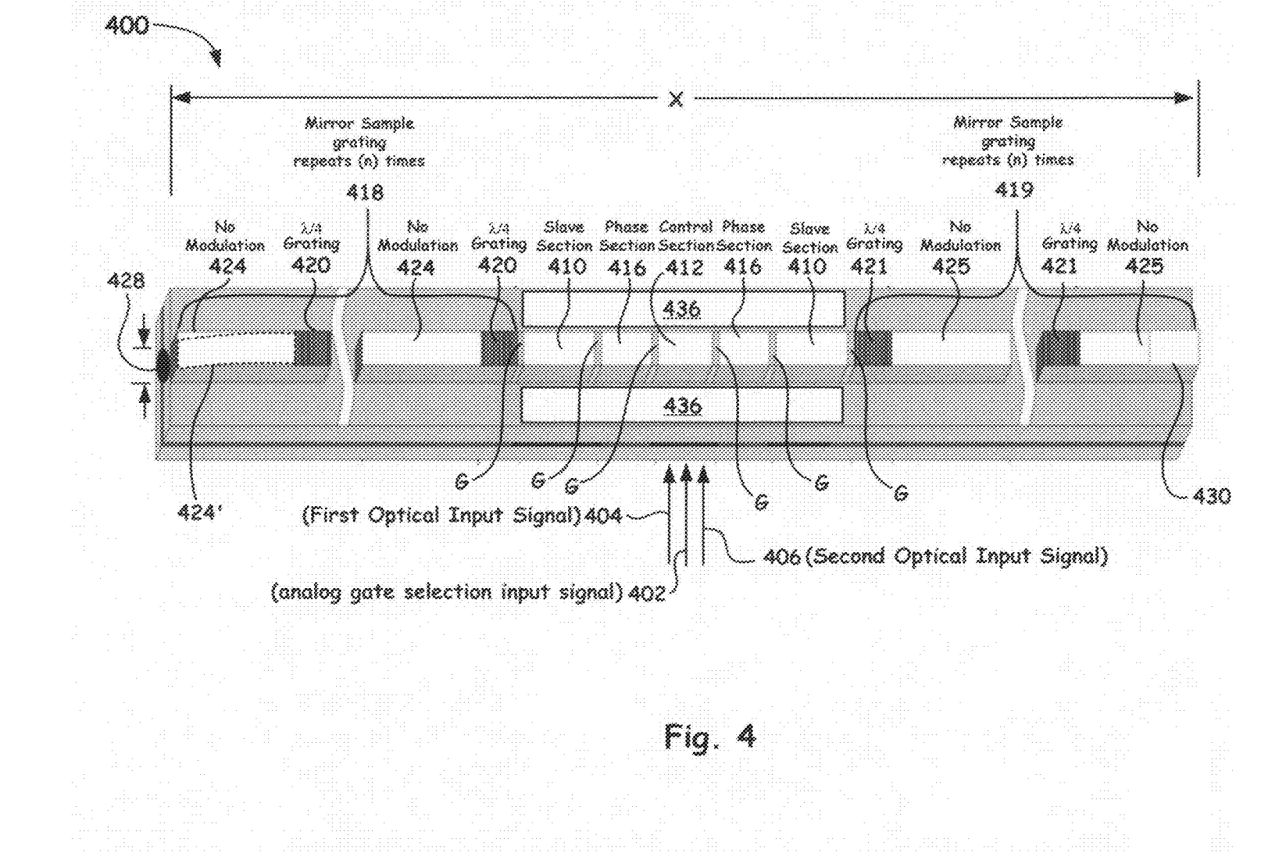
FIG. 4 shows a beneficial example device design of the present invention.

FIG. 4 shows a beneficial example device of the present invention and is generally designated by the reference numeral 400 having an overall design length X determined by the individual predetermined sections that make up the invention. Each section of the device, i.e., slave sections 410, control section 412, phase sections 416, and mirrors 418 and 419, is individually biased using electrical current injection in the electro-optical embodiment or using optical pumping in the all-optical embodiment. As shown in FIG. 4, an analog gate selection input signal 402 is utilized to adjust the operation point of the device 400 by translating the curves in FIG. 1b and one or more digital input ports (e.g., a first 404 and a second optical input signal 406 denoted by directional arrows are shown for simplicity), are arranged to partially quench the control section 412. Also shown in FIG. 4, are configured mirrors 418 and 419, such as, for example, sampled grating (SG) or superstructure grating (SSG) distributed Bragg reflectors (DBRs), each such mirror 418 and 419 configured with a predetermined number of $\lambda/4$ grating bursts 420 and 421 respectively and non-modulation regions 424 and 425 respectively, as discussed above, so as to provide predetermined reflection and net gain curves for the desired wavelengths of the present invention. An optical facet coating 428 for desired light wavelength transmission and reflection percentages are added to each output (only one shown for simplicity) for the device 400 prior to packaging. To further suppress the undesirable back reflection from the coated facet, a non-absorbing waveguide region 424' (e.g., an example curved region is denoted as a dashed line within the final non-modulation region 424) can be inserted immediately prior to the optical facet coating 428. The curved region causes the light that is incident on the facet coating to strike at an angle of about 5-15 degrees and allows the light to highly transmitted with minimal back reflection into the device (less than about $10^{-4}$-$10^{-5}$) as known by those skilled in the art.

Moreover, in addition to the slave 410 and control sections 412, a plurality of transparent sections (denoted as phase sections 416) can be configured in device 400, wherein such sections serve two purposes: to control phase and to control the index/gain lever strength. As beneficial configurations, such sections 416 can be created, using, for example, quantum well intermixing so that adjusting the bias on the section changes the refractive index but not the gain seen by the laser modes. The intermixed well is blue-shifted and thus transparent, but its carriers contribute a noticeable amount to the refractive index, i.e., the intermixed well has a large linewidth enhancement factor. For a fixed control section length and mode spacing, the length of the transparent section is chosen as a function of the desired slave section 410 carrier density. For a predetermined total length X, a longer transparent section reduces the slave section 410 length and forces a larger slave carrier 410 density and thereby increases both the gain lever and index lever, but reduces the wall plug efficiency of the device. Once the length of the transparent section is fixed, adjusting the bias on the section enables the alignment of the cavity phase so that device 400 is within about the 8% of the tuning range that passes through the 4 modes. Electrical isolation of the various sections is provided by leaving about a 3-4 µm gap, denoted by the letter G in FIG. 4, in the metal contact between sections and by heavily intermixing the quantum well underneath the gap to suppress carrier diffusion between sections.

To increase the output coupling fraction (i.e. contrast ratio), the number of grating bursts within the various embodiments of the present invention can be increased so that the reflectivity at the smallest local maximum is reduced. However, as the number of grating bursts increases, the sampled grating DBR behaves more like a continuous DBR and the effective length increases to $L_g/2$ at the central maximum as well as at the smallest local maximum. Thus, a higher $\Delta N_c$, is needed to achieve a given wavelength shift. Thus, there is a tradeoff between necessary input power for switching and contrast ratio since both increase with the number of grating bursts. An alternate arrangement that increases the contrast ratio includes configuring additional sections 430 (only one shown for simplicity) after the two mirrors 418 and 419, but prior to the facet coatings 428. These sections are lightly biased and slightly absorbing so as to act as saturable absorbers, whereby they strongly attenuate the transmitted light intensity when the light intensity is initially weak, but transmit nearly all of the light when the light intensity is initially strong. Thus, the contrast ratio is greatly increased and the only expense is a slight decrease of output power. In an additional embodiment, these saturable absorber sections are curved so that they also serve to suppress back reflection into the device.

It is desirable that the output signal amplitude (vertical scale of FIG. 1b) be slightly more than 1 unit high in order to compensate for waveguide and interface losses such as, for example, a 2.5 μm wide device configured with a fanout of 1.2. Since the left and right outputs are digital negations of each other, the effective fanout is actually double if half of the downstream gates are designed to work using complementary logic, i.e., deMorgan's Laws. For some gates of the present invention, such as clock source distribution nodes or gates that drive several logic stages in a cascaded circuit, high fanout is necessary, i.e. a 10-unit output signal or beneficially ten 1-unit output signals. The periodic power dependence shown in FIG. 1b, which is vital for achieving a universal gate, implies that a 2 unit input signal acts similar to a 0 unit signal. Thus, the present invention can provide configurations for such high power signals to reduce the signal back down to 1 unit amplitude before being used in downstream gates, e.g., by utilizing splitter and/or attenuators or threshold cutoff gates as known by those skilled in the art.

Besides performing logic operations, the invention can also beneficially operate as an environmental sensor. By functionalizing the device with a lateral surface coating, 436, as shown in FIG. 4, the carrier density in the control section can respond in the presence of specific chemical or biological stimulants in a manner similar to the way it responds in the presence of an optical input signal. The coating's optical properties (e.g., extinction coefficient) change when specific molecules adsorb to the surface. For example, with a thin Pd lateral surface coating (approximately 5 nm thick), $H_2$ gas changes Pd to PdH and reduces the internal loss, $\alpha_i$, from 57 $cm^{-1}$ at a rate of about 1.5 $cm^{-1}$ per percent $H_2$ assuming that the laser mode has a small overlap, of approximately $10^{-4}$, with the Pd coating. As $H_2$ is adsorbed, the internal loss is reduced and so the circulating power, $P_{circ}$, increases. This reduces the average carrier density, $N_{avg}$, because of increased stimulated emission. This changes the round-trip cavity phase and the phase shift is enhanced in our multiple section laser according to the gain-index lever, described above. The Vernier effect further magnifies the shift and causes the laser to jump to the next adjacent mode and thereby cause the output facet to alternate.

In this configuration, the invention acts as a transducer with digital threshold detection. Course electronic control of the $H_2$ threshold level is achieved by adjusting the biases on the slave and control sections since they determine the strength of the gain-index lever. Fine electronic control is achieved by adjusting the bias on the phase section. If the phase in the absence of $H_2$ is set near a mode hop point, an extremely low minimum detection limit (MDL) of less than about 2 ppm can be achieved. The ultimate MDL is determined primarily by the stability of the drive currents and other ambient environmental conditions. Compared to conventional optical $H_2$ sensors that use fiber gratings, surface plasmon resonances, or surface reflectance, the various sensors described herein offer the benefits of smaller size, monolithic integration of laser source and detector, and 2-D scalability to an array of sensors (e.g. using etched facet lasers and on-chip waveguide interconnects) that are functionalized to detect different chemical and biological agents. In a similar manner, the invention can be functionalized to be sensitive to other physical effects, such as temperature, strain, pressure, magnetic field, and refractive index of the ambient environment.

Figure 5A:
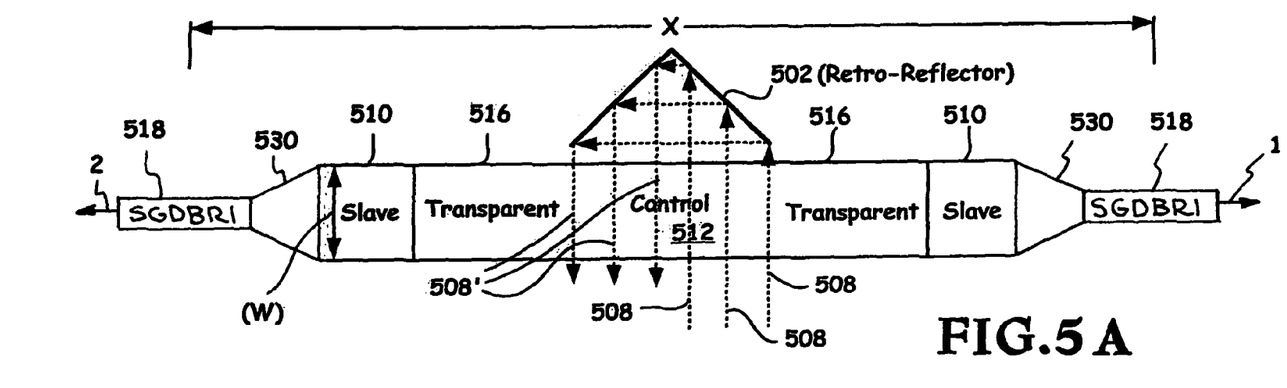
FIG. 5a illustrates high fanout multimode interferometer (MMI) example arrangement.

FIG. 5a shows an example device arrangement that uses techniques of the present invention to increase the fanout by reflecting the input light a fixed number of times across the control region by using retro-reflecting configurations and/or by making the laser a multimode interferometer (MMI). Similar to embodiments discussed above, the cascadable device can include interposed sections therein such as, a slave section 510, a transparency section 516, DBR sections 518 and a control section 512 and having an output signal port 2 and an output signal port 1. In the example embodiment of FIG. 5a, input light 508 (which can include a gate selection signal and one or more additional optical input signals) now makes a double pass (as denoted by the traveling dashed arrows with the return denoted by 508') across control region 512 via a retro-reflecting optic 502, such as, but not limited to a waveguide corner cube mirror, or a roof prism, etc., which effectively doubles the input power. Also, when configured as a multi-mode interferometer (MMI), the device(s) disclosed herein allows the laser width (W) to be increased by a predetermined amount (e.g., up to about 7.2 μm from an example 2.5 μm wide gate), which increases the output power.

The SG-DBR mirrors are located inside the single mode waveguides on either side of the MMI and so the total length of the MMI is equal to the length of the active laser region, e.g., 211.4 μm. The ends of the MMI are tapered 530 to prevent unwanted back reflection. The width (W) of the MMI is chosen to provide 1 to 1 imaging of the light reflecting from the SG-DBR mirrors, $$W_{MMI} = \sqrt{\frac{3\lambda}{4n_r} L_{MMI}} = 7.2 \; \mu m. \qquad 12)$$

By placing the SG-DBR mirrors inside the single mode region, only the laser modes that self image at the reflectors lase. In this configuration, the output light is single mode, but inside the active laser region, the laser beam is effectively wider. For a predetermined carrier density bias, the output power of the MMI is larger by a factor of about 7.2/2.5=2.88. The necessary input power for mode switching remains unchanged. Such arrangements enable a fanout ratio of output to input amplitude to increase from 1.2 up to about 6.9 for a two pass arrangement, as shown in FIG. 5a. Accordingly, the overall fanout ratio can be further increased in proportion to the number of total passes, e.g., up to a fanout increase to about 55 for 16 passes.

Figure 5B:
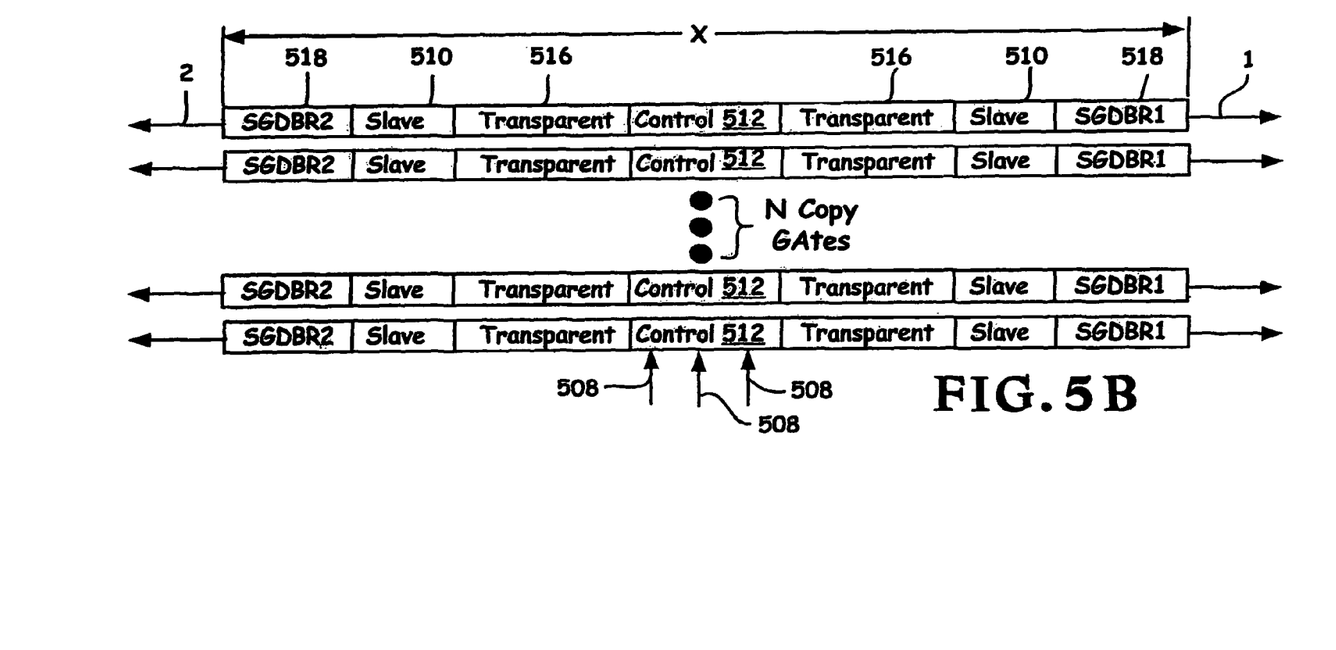
FIG. 5b shows an alternative example embodiment for achieving high fanout by making multiple copies of the input signal.

FIG. 5b shows an alternative design having similar reference numerals as discussed above for FIG. 5a, to achieve high fanout by making multiple copies of the input signals (e.g., gate selection input signal 508 and one or more additional input signals, such as, a first optical input signal 504 and a second optical input signal 506). This can be accomplished by reusing the such signals, i.e., 504, 506, and 508, to drive many COPY gates (denoted as N Copy Gates) of at least about 20 or more in parallel (note; such an arrangement produces a fanout increase of up to about 24 (1.2×20=24)). It is to be appreciated that gain for the input signal when traversing each control section 512 is compensates for individual losses, such as, interface losses. Because of such a novel structure, the gates (i.e., control section 512) act as a signal splitter with built in amplitude regeneration. This technique has two additional benefits over the MMI layout with the multi-pass input of FIG. 5*a*. First, the production is simpler since, for example, a retro-reflector and MMIs do not have to be fabricated. Each COPY gate can thus be programmed using a generic universal logic gate. Second, dedicated splitting elements and amplitude regulators do not have to be fabricated. The outputs are already normalized to the correct 1 bit amplitude. Thus, the multiple COPY gate is a beneficial approach for high fanout applications. Every optical element in the circuit can be manufactured substantially similar and functionality of sub-circuit modules can be determined by their layout and gate selection signals.

The devices disclosed herein are often mounted epitaxial side down on a heat-sink with an active temperature controller capable of better than +0.072° C. long-term stability to achieve less than about +0.05 equivalent optical units of temperature fluctuations. The sensitivity of the gate to temperature and bias current can be used to compensate for slight manufacturing errors. Active temperature control can also be used to coarsely align the gain peak of the wafer with the mirror reflectivity spectrum. Fine alignment to compensate for wafer non-uniformity can be performed on each gate or region of gates by slight adjustments of the biases on each mirror and on the control, slave, and transparent sections. With such a large number of degrees of freedom, the operating conditions that produce the output power versus input power curves closest to the ideal cases in FIG. 1*b* can also be found using a suitable gradient search technique.

Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The invention claimed is:

1. An optical apparatus, comprising:
   a plurality of optical output facets that defines an optical cavity;
   plurality of N cascaded predetermined optical structures disposed therein said optical cavity and configured to provide a gain index lever for said apparatus; and
   a control section also disposed therein said optical cavity and configured to receive a gate selection signal and at least one input signal so as to actuate said gain index lever so that a predetermined wavelength shift can be produced to alternate one or more optical signals through desired said optical output facets.

2. The apparatus of claim 1, wherein alternating optical signals are produced when said predetermined wavelength shift is produced, wherein said gate selection signal and said at least one input signal in combination with said alternating optical signals comprise a Boolean digital logic operation.

3. The apparatus of claim 2, wherein said digital logic operation comprises a Boolean OR logic gate.

4. The apparatus of claim 2, wherein said digital logic operation comprises a Boolean XOR logic gate.

5. The apparatus of claim 2, wherein said digital logic operation comprises a Boolean AND logic gate.

6. The apparatus of claim 2, wherein said digital logic operation comprises a Boolean NAND logic gate.

7. The apparatus of claim 2, wherein said digital logic operation comprises a Boolean NOR logic gate.

8. The apparatus of claim 2, wherein said digital logic operation comprises a Boolean XNOR logic gate.

9. The apparatus of claim 2, wherein said digital logic operation comprises a Boolean COPY logic gate.

10. The apparatus of claim 2, wherein said digital logic operation comprises a Boolean NOT logic gate.

11. The apparatus of claim 1, wherein said plurality of N cascaded predetermined optical structures disposed therein comprises at least one of: a slave section, a transparent section, and a pair of mirrors.

12. The apparatus of claim 11, wherein said mirrors comprise a Sampled grating (SG) distributed Bragg reflector (DBR).

13. The apparatus of claim 11, wherein said mirrors comprise a superstructure grating (SSG) distributed Bragg reflector (DBR).

14. The apparatus of claim 11, wherein said mirrors are non-absorbing for desired wavelengths via biasing at transparency.

15. The apparatus of claim 11, wherein said mirrors are non-absorbing for desired wavelengths via a quantum well intermixing configuration to blue-shift the band-gap.

16. The apparatus of claim 11, wherein said transparent section controls the phase and index/gain lever strength of said apparatus.

17. The apparatus of claim 11, wherein said transparent section comprises a quantum well intermixing configuration so that adjusting a bias on said transparent section changes the refractive index but not the gain for one or more laser modes.

18. The apparatus of claim 1, wherein said plurality of N cascaded predetermined optical structures disposed therein comprises a curved region adapted to suppress undesirable back reflections from said facets.

19. The apparatus of claim 1, wherein said plurality of N cascaded predetermined optical structures disposed therein comprises a saturable absorber adapted to attenuate the transmitted light intensity when the light intensity is initially weak, but transmit nearly all of the light when the light intensity is initially strong.

20. The apparatus of claim 19, wherein said saturable absorber comprises a curved structure so that back reflections are suppressed.

21. The apparatus of claim 1, wherein a plurality of said optical apparatus are configured in a parallel arrangement and coupled via a respective control section so that an output fanout can be increased by up to about 24.

22. The apparatus of claim 21, wherein each of said control sections are adapted as a signal splitter with built in amplitude regeneration.

23. The apparatus of claim 1, wherein said optical cavity is designed for wavelengths from about 400 nm up to about 2000 nm.

24. The apparatus of claim 1, wherein said apparatus further comprises a functionalizing lateral surface coating.

25. The apparatus of claim 24, wherein said apparatus operates as an environmental sensor.

26. The apparatus of claim 25, wherein said apparatus produces a detection sensitivity of less than about 2 ppm.

27. An optical apparatus, comprising:
- a plurality of optical output facets that defines an optical cavity;
- a multi-mode interferometer disposed therein said optical cavity, said interferometer adapted from a plurality of N cascaded predetermined optical structures adapted to further provide a gain index lever for said apparatus; and
- a control section also disposed therein said optical cavity and configured as part of said multi-mode interferometer, said control section adapted to receive a gate selection signal and at least one input signal so as to actuate said gain index lever so that a predetermined wavelength shift can be produced to alternate one or more optical signals either through desired said optical output facets.

28. The apparatus of claim 27, wherein said apparatus further comprises a retro-reflector configured to provide up to about 16 passes of said gate signal and said at least one input signal across a control region.

29. The apparatus of claim 28, wherein said apparatus can produce a fanout amplitude increase of up to about 55.

30. The apparatus of claim 28, wherein said apparatus can produce a fanout amplitude increase of up to about 6.9.

31. The apparatus of claim 27, wherein alternating optical signals are produced when said predetermined wavelength shift is produced, wherein said gate selection signal and said at least one input signal in combination with said alternating optical signals comprise a Boolean digital logic operation.

32. The apparatus of claim 31, wherein said digital logic operation comprises a Boolean OR logic gate.

33. The apparatus of claim 31, wherein said digital logic operation comprises a Boolean XOR logic gate.

34. The apparatus of claim 31, wherein said digital logic operation comprises a Boolean AND logic gate.

35. The apparatus of claim 31, wherein said digital logic operation comprises a Boolean NAND logic gate.

36. The apparatus of claim 31, wherein said digital logic operation comprises a Boolean NOR logic gate.

37. The apparatus of claim 31, wherein said digital logic operation comprises a Boolean XNOR logic gate.

38. The apparatus of claim 31, wherein said digital logic operation comprises a Boolean COPY logic gate.

39. The apparatus of claim 31, wherein said digital logic operation comprises a Boolean NOT logic gate.

40. The apparatus of claim 27, wherein said plurality of N cascaded predetermined optical structures disposed therein comprises at least one of: a slave section, a transparent section, and a pair of mirrors.

41. The apparatus of claim 40, wherein said mirrors comprise a Sampled grating (SG) distributed Bragg reflector (DBR).

42. The apparatus of claim 40, wherein said mirrors comprise a superstructure grating (SSG) distributed Bragg reflector (DBR).

43. The apparatus of claim 40, wherein said mirrors are non-absorbing for desired wavelengths via biasing at transparency.

44. The apparatus of claim 40, wherein said mirrors are non-absorbing for desired wavelengths via a quantum well intermixing configuration to blue-shift the band-gap.

45. The apparatus of claim 40, wherein said transparent section controls the phase and index/gain lever strength of said apparatus.

46. The apparatus of claim 40, wherein said transparent section comprises a quantum well intermixing configuration so that adjusting the bias on said transparent section changes the refractive index but not the gain for one or more laser modes.

47. The apparatus of claim 27, wherein said plurality of N cascaded predetermined optical structures disposed therein comprises a curved region adapted to suppress undesirable back reflections from said facets.

48. The apparatus of claim 27, wherein said plurality of N cascaded predetermined optical structures disposed therein comprises a saturable absorber adapted to attenuate the transmitted light intensity when the light intensity is initially weak, but transmit nearly all of the light when the light intensity is initially strong.

49. The apparatus of claim 48, wherein said saturable absorber comprises a curved structure so that back reflections are suppressed.

50. The apparatus of claim 27, wherein said optical cavity is designed for wavelengths from about 400 nm up to about 2000 nm.

51. The apparatus of claim 27, wherein said apparatus further comprises a functionalizing lateral surface coating.

52. The apparatus of claim 51, wherein said apparatus operates as an environmental sensor.

53. The apparatus of claim 52, wherein said apparatus produces a detection sensitivity of less than about 2 ppm.

54. An optical method, comprising:
- providing a plurality of output facets that define an optical cavity;
- providing a plurality of N cascaded predetermined optical structures disposed therein said optical cavity, said structures further adapted to provide a gain index lever; and
- receiving a gate selection signal and at least one input signal so as to actuate said gain index lever so that a predetermined wavelength shift can be produced to alternate one or more optical signals therethrough said output facets.

55. The method of claim 54, wherein alternating optical signals are produced when said predetermined wavelength shift is produced, wherein said gate selection signal and said at least one input signal in combination with said alternating optical signals comprise a Boolean digital logic operation.

56. The method of claim 55, wherein said digital logic operation comprises a Boolean OR logic gate.

57. The method of claim 55, wherein said digital logic operation comprises a Boolean XOR logic gate.

58. The method of claim 55, wherein said digital logic operation comprises a Boolean AND logic gate.

59. The method of claim 55, wherein said digital logic operation comprises a Boolean NAND logic gate.

60. The method of claim 55, wherein said digital logic operation comprises a Boolean NOR logic gate.

61. The method of claim 55, wherein said digital logic operation comprises a Boolean XNOR logic gate.

62. The method of claim 55, wherein said digital logic operation comprises a Boolean COPY logic gate.

63. The method of claim 55, wherein said digital logic operation comprises a Boolean NOT logic gate.

64. The method of claim 54, wherein said plurality of N cascaded predetermined optical structures disposed therein comprises at least one of: a slave section, a transparent section, and a pair of mirrors.

65. The method of claim 64, wherein said mirrors comprise a Sampled grating (SG) distributed Bragg reflector (DBR).

66. The method of claim 64, wherein said mirrors comprise a superstructure grating (SSG) distributed Bragg reflector (DBR).

67. The method of claim 64, further comprising biasing at transparency said mirrors so that said mirrors are non-absorbing for desired wavelengths.

68. The method of claim 64, further comprising quantum well intermixing said mirrors to blue-shift the band-gap so that said mirrors are non-absorbing for desired wavelengths via a configuration.

69. The method of claim 64, further comprising controlling said transparent section to manipulate the phase and index/gain lever strength.

70. The method of claim 64, further comprising quantum well intermixing said transparent section so that adjusting a bias on said transparent section changes the refractive index but not the gain for one or more laser modes.

71. The method of claim 54, wherein said optical cavity is designed for wavelengths from about 400 nm up to about 2000 nm.

72. The method of claim 54, further comprising: providing a functionalizing lateral surface coating.

* * * * *